United States Patent [19]

Padget et al.

[11] Patent Number: 4,686,278

[45] Date of Patent: Aug. 11, 1987

[54] RECOVERING CHLORINATED POLYMERS FROM SOLUTION

[75] Inventors: John C. Padget, Cheshire, England; James T. Forrester, deceased, late of Cheshire, England, by Mary Forrester, executor

[73] Assignee: Imperial Chemical Industries plc, London, England

[21] Appl. No.: 811,325

[22] Filed: Dec. 19, 1985

Related U.S. Application Data

[63] Continuation of Ser. No. 717,679, Mar. 29, 1985, abandoned.

[30] Foreign Application Priority Data

Apr. 2, 1984 [GB] United Kingdom ............... 8408443

[51] Int. Cl.$^4$ ............................................. C08F 6/12
[52] U.S. Cl. ................................... 528/495; 528/500
[58] Field of Search ................. 524/385; 528/495, 500

[56] References Cited

U.S. PATENT DOCUMENTS

| | | | |
|---|---|---|---|
| 4,122,249 | 10/1978 | Padget | 528/495 X |
| 4,144,203 | 3/1979 | Hoehne et al. | 528/500 X |
| 4,206,093 | 6/1980 | Hoehne et al. | 528/500 X |
| 4,430,483 | 2/1984 | Alfes et al. | 528/500 X |

FOREIGN PATENT DOCUMENTS

| | | | |
|---|---|---|---|
| 42-871 | 1/1967 | Japan | 528/495 |
| 2032927A | 5/1980 | United Kingdom | 528/495 |

*Primary Examiner*—Paul R. Michl
*Attorney, Agent, or Firm*—Cushman, Darby & Cushman

[57] ABSTRACT

A process for recovering a chlorinated polymer of low residual solvent content, preferably less than 1% by weight, from solution in a chlorinated hydrocarbon solvent which comprises treating the solution with steam or hot water (thereby separating the chlorinated polymer in solid form) in the presence of a minor amount of both a chlorinated paraffin and an aliphatic alcohol containing at least 8 carbon atoms.

8 Claims, No Drawings

RECOVERING CHLORINATED POLYMERS FROM SOLUTION

This is a continuation of application Ser. No. 717,679, filed Mar. 29, 1985, which was abandoned upon the filing hereof.

This invention relates to recovering chlorinated polymers (which term includes copolymers) from solution and particularly to recovering chlorinated polymers from solutions in which they are prepared.

It is well known to prepare chlorinated polymers by chlorintion of aliphatic polymers (for example natural rubber, polybutadiene, polyisoprene, polyethylene, polypropylene and ethylene/propylene copolymers and mixtures thereof) in solution in a suitable solvent, the process comprising introducing gaseous chlorine into the solution of the aliphatic polymer at an elevated temperature, for example 60° C. to 120° C. The solvents commonly employed in this process are chlorinated hydrocarbons and include not only those chlorinated hydrocarbons which are chemically inert to chlorine but also those which may react to some degree with chlorine to yield chlorinated products which are inert to chlorine. Examples of solvents used are carbon tetrachloride, chloroform, methylene chloride, trichloroethylene, tetrachloroethane and perchloroethylene and mixtures thereof. The chlorinated polymer may be isolated in solid form from the solution (in which it is soluble) by treating the solution with steam or hot water, thereby distilling off the solvent. The solid chlorinated polymer may be dried by conventional means.

It is well known that solid chlorinated polymers produced by the known process often contain an appreciable amount of residual solvent, even after the product has been dried. For example, residual solvent contents up to 10% by weight of the chlorinated polymer are fairly typical. This residual solvent is difficult to remove by further drying or direct distillation techniques.

Several techniques have been proposed for reducing the residual solvent content of chlorinated polymers prepared by the known process. One such technique comprises incorporating a plasticiser such as a chlorinated paraffin in the reaction mixture in which the chlorinated polymer is prepared (and hence in the solution from which the chlorinated polymer is to be recovered). Solid chlorinated polymers recovered from solutions containing chlorinated paraffins in general have a lower residual solvent content after drying than chlorinated polymers recovered from solution in the absence of chlorinated paraffins. However it is desirable that the residual solvent content of the recovered chlorinated polymers should be below 1% by weight and in order to acheive this desirable result it is necessary to incorporate a large amount of the chlorinated paraffin in the solution. The minimum amount of chlorinated paraffin required in the solution to ensure a residual solvent content of less than 1% by weight in the recovered chlorinated polymer depends upon the drying conditions employed but is generally about 10% by weight based on the chlorinated polymer. At such high levels of chlorinated paraffins, the chlorinated polymer tends to be sticky at the temperatures used to precipitate and dry it and presents problems during these stages of the process.

Another known technique for reducing the residual solvent content of solution-prepared chlorinated polymers comprises recovering the chlorinated polymer from the solution in the presence of a polymer lubricant which is an aliphatic carboxylic acid or alcohol containing at least 8 carbon atoms which is compatible with the chlorinated polymer. Such a technique is described in our United Kingdom Patent Specification No. 1,519,711. Alcohols containing 8 or more carbon atoms can result in a low residual solvent content in the recovered chlorinated polymer and may result in a residual solvent content below 1% by weight if used in an amount of at least about 5% by weight based on the chlorinated polymer. Unfortunately, when used in such large amounts the alcohol has an unacceptable deleterious effect upon the properties of the chlorinated polymer and in particular leads to cloudy films which demonstrate incompatability of the alcohol and the polymer resulting in down-grading of the performance of paints containing the polymer.

For the above reasons the use of chlorinated paraffins or long-chain aliphatic alcohols has not proved to be a satisfactory way of reducing residual solvent levels in chlorinated polymers to acceptably low values, for example below 1% by weight of the chlorinated polymers. We have now found, however, that use of both a chlorinated paraffin and a long-chain aliphatic alcohol enables the residual solvent content of solution-prepared chlorinated polymers to be reduced to acceptably low levels (and particularly to below 1% by weight) without seriously impairing the properties of the chlorinated polymers. The present invention resides in use of a chlorinated paraffin and a long-chain aliphatic alcohol, each in an amount of (a) less than the amount required using the component alone and (b) less than the amount at which the component seriously impairs the properties of films derived from the recovered chlorinated polymers.

According to the present invention there is provided a process for recovering a chlorinated polymer of low residual solvent content from solution in a chlorinated hydrocarbon solvent which comprises treating the solution with steam or hot water (thereby separating the chlorinated polymer in solid form) in the presence of a minor amount of both a chlorinated paraffin and an aliphatic alcohol containing at least 8 carbon atoms.

A preferred embodiment of the process resides in recovering a chlorinated polymer of residual solvent content below about 1% by weight based on the chlorinated polymer by recovering the chlorinated polymer in the presence of a chlorinated paraffin in an amount of up to 8% by weight based on the chlorinated polymer and an aliphatic alcohol containing at least 8 carbon atoms in an amount of up to 2% by weight based on the chlorinated polymer.

The recovered chlorinated polymer in solid form containing a chlorinated paraffin and an aliphatic alcohol containing at least 8 carbon atoms and having a low residual solvent content (especially a residual solvent content below 1% by weight based on the chlorinated polymer) is provided according to a further feature of the invention.

The chlorinated paraffins are well known, commercially available materials and any of the known chlorinated paraffins may be used in the invention. Chlorinated paraffins containing at least 8 and preferably at least 12 carbon atoms and from 30% to 70% by weight of chlorine are preferred, especially chlorinated paraffins containing from 20 to 35 carbon atoms and from 35% to 60% by weight of chlorine. Mixed chlorinated paraffins, obtained for example by chlorination of a mixture of paraffins of say 10 to 13 or 14-17 carbon atoms, may be employed.

The aliphatic alcohol contains at least 8 carbon atoms and preferably contains at least 12 carbon atoms, and may be for example stearyl alcohol or cetyl alcohol. Alcohols containing more than one hydroxyl group may be employed, as may mixtures of alcohols.

The total amount of chlorinated paraffin and alcohol added to the solution will usually be at least 1% by weight of the chlorinated polymer being recovered and may be up to about 15% by weight provided that the chlorinated paraffin and the alcohol each is added in an amount of less than the amount at which it results in an unacceptable property in films derived from the recovered chlorinated polymer. Thus, in general and as a guide, the chlorinated paraffin is used in amount of less than 10% by weight based on the recovered chlorinated polymer and the alcohol is used in an amount of less than 5% by weight based on the recovered chlorinated polymer.

The relative proportions by weight of the chlorinated paraffin and the alcohol may vary within wide limits, depending from example upon the particular components used and the particular chlorinated polymer being recovered. Generally the relative proportions of chlorinated paraffin: alcohol will be at least 2:1 and may be as high as 10:1. We have obtained chlorinated polymers from solution in carbon tetrachloride containing less than 1% by weight residual solvent when using a relative proportion of chlorinated paraffin: alcohol of from 5:1 to 8:1. In an especially preferred embodiment of the invention, the relative proportion is about 7:1-1.5.

The invention is illustrated by the following example.

EXAMPLE 1

A 23% w/w solids solution of a chlorinated rubber (a 50:50 mixture by weight of chlorinated polybutadiene and chlorinated polyisoprene of chlorine content about 66%) in carbon tetrachloride was diluted with carbon tetrachloride to 10% w/w solids. Five samples, each of 100 g (containing 10 g of chlorinated rubber), of the solution were taken and additions were made to four of them as follows:

| Sample | "Cereclor" 42. (g) | "Dobanol" 45 (g). |
|--------|--------------------|-------------------|
| A | 0 | 0 |
| B | 0 | 0.1 |
| C | 0.8 | 0 |
| D | 0.8 | 0.1 |
| E | 1.0 | 0 |

"Cereclor" 42 is a chlorinated paraffin mixture containing 42% by weight chlorine and derived from a mixture of C20 to C35 paraffins.

"Dobanol" 45 is a mixture of C14 and C15 aliphatic alcohols.

Each of Samples A to E was injected into agitated hot water (95° C.) to distill off the carbon tetrachloride and precipitate the chlorinated rubber in solid (actually fibrous) form. The resulting slurry was agitated for 20 minutes during which time small samples were taken at intervals of 0, 2, 6, 10 and 20 minutes and analysed for residual carbon tetrachloride content by gas-liquid chromatography. At the end of the 20 minutes agitation, the chlorinated rubber was dewatered and dried at 60° C. for 14 hours after which its glass-transition temperature (Tg) was determined. The results are shown in Table 1.

TABLE 1

| Sample | Residual CTC (% w/w on dry polymer) after residence in water at 95° C. | | | | | Tg. (°C.) |
|--------|-------|-------|-------|--------|--------|-----------|
| | 0 min | 2 min | 5 min | 10 min | 20 min | |
| A | 12.9 | 9.8 | 7.7 | 7.0 | 7.0 | 129 |
| B | 9.8 | 8.5 | 7.1 | 7.4 | 6.9 | 128 |
| C | 10.5 | 6.6 | 4.3 | 3.8 | 3.7 | 97 |
| D | 7.2 | 3.4 | 3.3 | 1.8 | 0.9 | 96 |
| E | 11.6 | 8.2 | 5.6 | 3.9 | 2.8 | 90 |

It was observed in the case of Sample E (10 w/w "Cereclor" 42 based on the chlorinated rubber) that the recovered chlorinated rubber was soft and sticky and agglomeration of particles occurred; the preciptitate could not be handled in a large-scale precipitation vessel.

The results show that:

1. Increasing the chlorinated paraffin content of the solution results in a decrease in the residual solvent content of the recovered chlorinated rubber—Samples A, C and E.

2. Increasing the chlorinated paraffin content of the solution results in a decrease in the Tg of the recovered chlorinated rubber—Samples A, C and E.

3. At the level of 10% w/w based on the chlorinated rubber, "Cereclor" 42 produces a recovered product having unsatisfactory properties; moreover the residual solvent level in the recovered product is only slightly less than 3% by weight after a residence time of 20 minutes in hot water (Sample E).

4. At the level of 8% w/w based on the chlorinated rubber, "Cereclor" 42 yields a product with tolerable properties but having a residual solvent content of nearly 4% by weight after a residence time in hot water of 20 minutes (Sample C).

5. At the level of 1% w/w based on the chlorinated rubber "Dobanol" 45 alone has no appreciable effect upon the residual solvent content of the chlorinated rubber after a residence time in hot water of 10-20 minutes. (Sample B compared with Sample A).

6. At the levels of 8% w/w "Cereclor" 42 and 1% w/w "Dobanol" 45 based on the chlorinated rubber, a chlorinated rubber product of acceptable properties (yielded clear, non-sticky films) and residual solvent content below 2% w/w after 10 minutes and below 1% w/w after 20 minutes residence in hot water was obtained. (Sample D).

7. "Dobanol" 45 has no appreciable effect upon the Tg of the recovered chlorinated rubber (Compare Sample B with Sample A and Sample D with Sample C).

For purposes of comparison a further series of experiments was carried out using levels of "Dobanol" 45 alone up to 5% w/w based on the chlorinated rubber. It was observed that at the level of 5% w/w, "Dobanol" 45 resulted in reduction of the residual solvent content of the chlorinated rubber to below 1% w/w after 20 minutes residence time in water at 95° C., but that at levels above about 2% w/w, "Dobanol" 45 was incompatible with the chlorinated rubber in cast films, so that the film was very cloudy in appearance.

EXAMPLE 2

Solution A

"Cereclor" 42 was mixed with chlorinated rubber (50:50 PB:PI) solution containing 23% (w/w) solids in an amount such that the final product, when recovered and dried, contained 6.5% "Cereclor" 42. The chlorinated rubber contained 65.5% (w/w) of chlorine.

Solution B

"Dobanol" 45 was mixed with carbon tetrachloride (CTC) to give a 50% (w/w) solution. This solution was added to Solution A, so that the final product, when recovered and dried, contained 1% (w/w) "Dobanol" 45.

Solution C

More "Dobanol" 45 solution in CTC was added to Solution B to give 2% (w/w) "Dobanol" in the recovered and dried chlorinated polymer.

Each of Solutions A, B and C were added to hot water at 93°–94° C. The precipitated polymer was separated from the aqueous phase and dewatered and dried at 25° C. in a fluidised bed.

The CTC contents of the dried products recovered from Solutions A, B and C were measured by gas chromatography. Each sample was then heated in a static bed oven at 115° C.; the CTC content was measured after 20 minutes.

| | % CTC Content | |
|---|---|---|
| Sample from Solution | after drying at 25° C. | after heating at 115° C. |
| A | 5.3 | 1.26 |
| B | 5.2 | 0.42 |
| C | 4.4 | 0.10 |

EXAMPLE 3

Solution A

"Cereclor" 42 was added to a chlorinated rubber (50:50 PB:PI) solution containing 23% (w/w) solids to give 6% (w/w) in the recovered, dried product. The % (w/w) of fixed chlorine in the chlorinated rubber was 66.

Solution B

A 50% (v/v) solution of "Synprol" in CTC was added to Solution A, so that the concentration of "Synprol" in the recovered, dried product was 1% (w/w). "Synprol" is a mixture of alcohols of 13, 14 and 15 carbon atoms.

Each of Solutions A and B was added to hot water at 93° C. to precipitate the product which was then dewatered and dried at 25° C. in a fluidised bed. The CTC contents of the products were measured by gas chromatography. Samples were then heated in a static bed oven at 105° C. for 30 minutes, after which time CTC contents were again determined.

| | % CTC Content | |
|---|---|---|
| Sample from Solution | after drying at 25° C. | after heating at 115° C. |
| A | 5.0 | 1.4 |
| B | 4.0 | 1.0 |

Good, clear films were obtained when the products were dissolved in toluene and cast onto glass plates.

EXAMPLE 4

Solution A

"Cereclor" 42 was added to a chlorinated rubber (50:50 PB:PI) solution containing 10% (w/w) of solids to give 8% (w/w) in the final product.

Solution B

A 33% (w/w) solution of "Dobanol" 45 was added to Solution A to give 1% (w/w) in the final product. The product from each of Solution A and B was precipitated at 93° C. in hot water, recovered and put in cold water immediately. The products were dried at ambient temperature in a vacuum oven.

The CTC content of each sample was measured by gas chromatography. Each sample was heated in a static bed oven at 110° C. and the CTC content of each was measured after 15 minutes and after 30 minutes.

| | % CTC | | |
|---|---|---|---|
| Sample from Solution | Initial | after 15 mins | after 30 mins |
| A | 7.3 | 2.1 | 0.7 |
| B | 7.6 | 1.2 | 0.1 |

EXAMPLE 5

The procedure described in Example 4 was repeated except that "Cereclor" S30 was used instead of "Cereclor" 42 and the drying at 110° C. was carried out for 20 minutes after which residual CTC was determined.

| | After 20 minutes | |
|---|---|---|
| Sample from Solution | Initial | After 20 minutes |
| A | 6.8 | 1.0 |
| B | 6.0 | 0.2 |

"Cereclor" S30 is a mixture of chlorinated C14 to C17 paraffins of chlorine content 30% by weight.

What is claimed is:

1. A process for recovering a chlorinated polymer of low residual solvent content from solution in a chlorinated hydrocarbon solvent which comprises treating the solution with steam or hot water, thereby separating the chlorinated polymer in solid form, in the presence of both a chlorinated paraffin containing at least 8 carbon atoms in an amount of up to 10% by weight of the chlorinated polymer being recovered and an aliphatic alcohol containing at least 8 carbon atoms in an amount of up to 5% by weight of the chlorinated polymer being recovered.

2. A process as in claim 1 wherein the relative proportions by weight of the chlorinated paraffin and the alcohol is in the range of from 2:1 to 10:1.

3. A process as in claim 1 wherein the amount of the chlorinated paraffin is up to 8% by weight and the amount of the alcohol is up to 2% by weight of the chlorinated polymer being recovered.

4. A process as claimed in any one of the claims 1, 2 or 3 wherein the chlorinated paraffin contains at least 8 carbon atoms and from 30% to 70% by weight of chlorine.

5. A process as in claim 4 wherein the chlorinated paraffin contains from 20 to 35 carbon atoms and from 35 to 60% by weight of chlorine.

6. A process as in any one of claims 1, 2 or 3 wherein the alcohol contains at least 12 carbon atoms.

7. A process as in claim 6 wherein the alcohol contains from 13 to 18 carbon atoms.

8. A process as in claim 7 wherein the alcohol is a mixture of C14 and C15 aliphatic alcohols.

* * * * *